Patented Oct. 12, 1954

2,691,662

UNITED STATES PATENT OFFICE 2,691,662

THERAPEUTIC COMPLEXES

Norman Barsel, Laurelton, N. Y., assignor to International Hormones, Inc., Brooklyn, N. Y., a corporation of New York No Drawing. Application March 18, 1952, Serial No. 277,287

9 Claims. (Cl. 260—397.3)

The present invention relates to water soluble complexes including cyclopentanophenanthrene derivatives and a process for preparing the same.

More particularly the present invention relates to water soluble complexes comprising the reaction product of 3-keto-$\Delta^4$-cyclopentanoperhydrodimethylphenathrene compounds with a salicylate selected from the group consisting of alkali metal salicylates and ammonium salicylates.

A relatively large number of phenanthrene derivatives are known which find useful therapeutic application. For example, testosterone, the male hormone, is a naturally occurring cyclopentanophenathrene derivative and has well-known therapeutic uses. Testosterone in the form of its esters, such as propionate, has been injected in oil solution and in other forms. One of the difficulties involved in the use of these compounds, however, has been the lack of solubility of these compounds in aqueous solutions, as for example, isotonic solutions. Up to the present time no therapeutically available true solution has been formed of the various hormones of the character referred to.

In accordance with the present invention, however, it has been found that true solutions may be formed containing relatively high available concentrations of various hormones and particularly those hormones characterized by a keto group in the 3-position and a double bond in the 4-position. Examples of hormones and phenanthrene derivatives of this type are testosterone, esters of testosterone with fatty acid, preferably a lower fatty acid such as testosterone acetate and testosterone propionate, similar esters with aromatic acids, such as testosterone benzoate, progesterone, 17-hydroxy-11-dehydrocorticosterone, 17-hydroxydesoxycorticosterone, corticosterone, desoxycorticosterone, esters of corticosterone and desoxycorticosterone, with fatty acids, preferably the lower fatty acids and aromatic acids, as for example desoxycorticosterone acetate, 17-hydroxycorticosterone and esters thereof.

Preferably these complexes are formed by reacting with compounds of the character above described a salicylate such as sodium salicylate. However, any of the alkali metal or ammonium salicylates may be utilized, as for example, potassium salicylate, lithium salicylate, cesium salicylate, etc.

It has been found that an especially suitable method for the preparation of the complexes is to dissolve a suitable quantity of the salicylate in water, thereafter add the phenanthrene compound of the character above described and then boil the reaction mixture for a relatively short period of time, as for example five minutes. The resultant reaction product can then be filtered and the filtrate concentrated to dryness with agitation. Preferably the concentration should take place under vacuum. The residue which is thus formed is an amorphous mass that may then be dissolved in distilled water to form a solution of the complex. Solutions may be formed of the testosterone complex, for example, that will give a concentration equivalent to 200 to 250 or more milligrams of testosterone per cubic centimeter.

It has been found that the salicylate salt reacts with the hormone or phenanthrene compounds is certain definite proportions. These proportions are equivalent molecularly to twice the number of double bonds and methyl keto groups present on the nucleus of the cyclopentanophenanthrene compound and the side chain thereof. For example, in the case of testosterone and similar compounds which contain a keto group at the 3-position and a double bond between the 4,5-positions, 4 mols of salicylate salt will react with each mol of testosterone. In the case of progesterone, which contains, in addition to the keto group at the 3-position and the double bond between the 4,5-positions, a keto group at the 20-position, 6 mols of the salicylate salt will react with each mol of the compound. It is to be understood that lesser quantities of the salicylate salt may be used but in those cases a lesser amount of complex will be formed and the solubility of the resultant mass in water will be correspondingly less.

It has further been found that in order to form any appreciable amount of complex the salicylate must be present in the aqueous solution in greater concentration than approximately 2 mols per liter of solution. In other words, the complex begins to disassociate whenever the concentration of the salicylate begins to go below about 2 mols per liter of water or aqueous medium.

Although, as pointed out, it is preferred, in forming the compound, to form the reaction mixture and then boil the mixture for a short period of time, these complexes may also be formed by reacting the phenanthrene compound with the salicylate salt at room temperature in the presence of water. In the case of the reaction at room temperature, the reaction proceeds more slowly so that a longer period of time is required for complete reaction.

Although it is believed that complex formation occurs, it is not intended to be limited to this explanation of the solubility characteristics of the reaction product above set forth. In general, however, there is substantial evidence that indicates that such a complex is formed between the phenanthrene compound and the salicylate salts. For example, there is a marked difference in solubility of the product after the reaction and prior thereto.

Further there is a distinct change in color produced on complex formation in aqueous solution, i. e. upon the formation of the complex the color of the reacting solution changes from a substantially colorless or milky appearance to a clear amber color.

In addition, ferric chloride no longer reacts as readily with the salicylate salt. For example, if a drop of dilute ferric chloride solution is added to a saturated solution of sodium salicylate a red color immediately appears. On the other hand, if a drop of dilute ferric chloride solution is added to a solution of the complex, no red color appears for a substantial length of time and it is only after vigorous shaking that a red color will appear at the end of several seconds. This would appear to demonstrate that the salicylate salt is in some chemical combination with the phenanthrene compound so that its reaction with the ferric chloride is hindered for an appreciable length of time.

Aqueous solutions of the complex may be used therapeutically as by intravenous injection and they appear to give the same general effect as equivalent concentrations of the various hormones. It is believed that the complex is decomposed in the body to yield the free hormone. It is evident, therefore, that the present invention provides a convenient method for the preparation of isotonic solutions in water of various hormones of the character described. The complexes may be designated generally in accordance with the following formula:

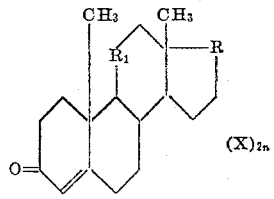

wherein $R_1$ is selected from the group consisting of $CH_2$, $C=O$ and $CH—OH$; R is selected from the group consisting of $C=O$, $CH—OH$, $CH—$lower fatty acid acylate, $CH—O$ benzoate,

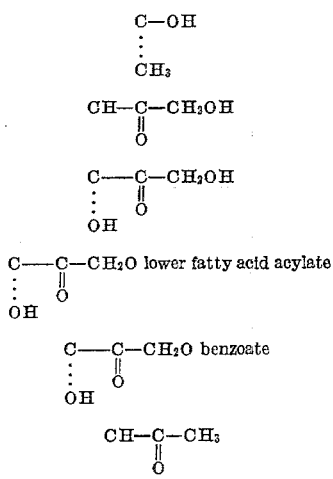

$X$ is selected from the group consisting of an alkali metal salicylate and ammonium salicylate and $n$ is a whole number corresponding to the number of methyl keto groups and double bonds in the cyclopentanophenanthrene ring and side chain.

The present invention is especially applicable to the adrenal cortical hormones and their derivatives, testosterone and its derivatives and progesterone.

The adrenal cortical hormone complexes may be indicated by the following formula:

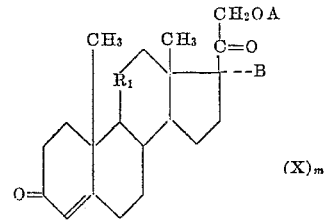

wherein $R_1$ is selected from the group consisting of $CH_2$, $C=O$ or $CH—OH$; B is selected from the group consisting of H and OH; A is selected from the group consisting of hydrogen, the residue of an aliphatic acid and the residue of an aromatic acid; X is selected from the group consisting of alkali metal and ammonium salicylates, and $m$ equals 6 when $R_1$ is $CH_2$ or $CH—OH$, and equals 8 when $R_1$ is $C=O$.

Similarly, the testosterone complex may be indicated by the following formula:

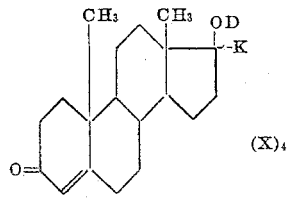

wherein D is selected from the group consisting of hydrogen, the esterification residue of a lower fatty acid and the residue of an aromatic acid, K may be hydrogen or a methyl group and X is selected from the group consisting of alkali metal and ammonium salicylates.

The progesterone complex may be indicated by the following formula:

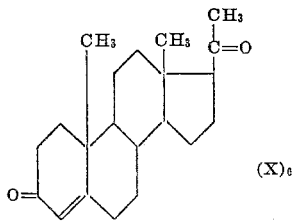

wherein X is selected from the group consisting of alkali metal and ammonium salicylates.

The following specific examples serve to illustrate but are not intended to limit the present invention:

*Example I*

A solution was formed of 4 mols of sodium salicylate in 1 liter of water. To this solution one mol of testosterone was added and the mixture boiled for 5 minutes. The reaction mixture was then filtered and the filtrate concentrated to dryness wih stirring under a vacuum. The residue thus formed was a crystalline residue that was soluble in distilled water preferably with heating to form a solution containing the equivalent of 285 mgms. of testosterone per cc., i. e. 920 mgms. of complex.

Example II

A solution was formed of 4 mols of sodium salicylate in 1 liter of water. To this solution 1 mol of testosterone acetate was added and the mixture boiled for 5 minutes. The reaction mixture was then filtered and the filtrate concentrated to dryness with stirring under a vacuum. The residue thus formed was an amorphous mass that was soluble in distilled water similarly to the compound of Example I.

Example III

A solution was formed of 4 mols of sodium salicylate in 1 liter of water. To this solution 1 mol of testosterone propionate was added and the mixture boiled for 5 minutes. The reaction mixture was then filtered and the filtrate concentrated to dryness with stirring under a vacuum. The residue thus formed was an amorphous mass that was soluble in distilled water to the extent indicated in the previous examples.

Example IV

A solution was formed of 6 mols of sodium salicylate in 1.25 liters of water. To this solution 1 mol of progesterone was added and the mixture was then filtered and the filtrate concentrated to dryness with stirring under a vacuum. The residue thus formed was an amorphous mass that was soluble in distilled water to the extent indicated in the previous examples. When a drop of dilute ferric chloride solution was added to the complex in aqueous solution no color appeared until the solution was vigorously shaken for over seven seconds.

Example V

A solution was formed of 6 mols of sodium salicylate in 1.25 liters of water. To this solution 1 mol of desoxycorticosterone acetate was added and the mixture boiled for 5 minutes. The reaction mixture was then filtered and the filtrate concentrated to dryness with stirring under a vacuum. The residue thus formed was an amorphous mass that was soluble in water to a degree similar to that previously referred to in the prior examples.

Example VI

The following compounds were utilized for complex formation as set forth in the preceding examples. In each instance the number of mols of sodium salicylate were utilized as set forth in the right hand column and where 4 mols of sodium salicylate were utilized one liter of water was used, where 6 mols of sodium salicylate were utilized 1.25 liters of water were used and where 8 mols of sodium salicylate were utilized 1.5 liters of water were used. In each instance one mol of the steroid formed the complex with the indicated mols of sodium salicylate.

| Compound | Number of keto groups and double bonds ($n$) | Mols of Sodium Salicylate per mol compound $2(n)$ |
|---|---|---|
| Testosterone benzoate | 2 | 4 |
| Methyl testosterone | 2 | 4 |
| $\Delta^4$-androsten-3,17-dione | 3 | 6 |
| 16-dehydroprogesterone | 4 | 8 |
| 17α-hydroxy-desoxycorticosterone acetate acetate (Reichstein's S acetate) | 3 | 6 |
| Cortisone | 4 | 8 |
| Cortisone acetate | 4 | 8 |
| Corticosterone | 3 | 6 |
| 17α-hydroxycorticosterone (Kendall's F) | 3 | 6 |

The present application is a continuation-in-part of Serial No. 161,743, filed May 12, 1950, which is in turn a continuation in part of application Serial No. 131,940, filed December 8, 1949.

It will be obvious to those skilled in the art that various changes may be made without departing from the spirit of the invention and therefore the invention is not limited to what is described in the specification but only as indicated in the appended claims.

I claim:

1. A water soluble steroid complex having the following formula:

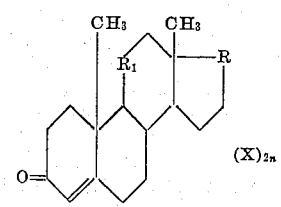

wherein $R_1$ is selected from the group consisting of $CH_2$, $C=O$ and $CH-OH$; R is selected from the group consisting of $C=O$, $CH-OH$, $CH-O$ lower fatty acid acylate, $CH-O$ benzoate,

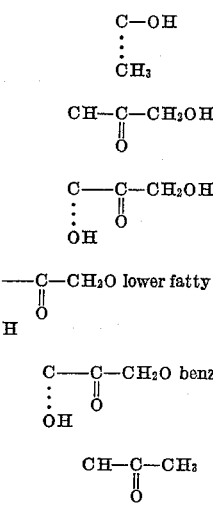

X is selected from the group consisting of an alkali metal salicylate and ammonium salicylate and $n$ is a whole number corresponding to the number of methyl keto groups and double bonds in the cyclopentanophenanthrene ring and side chain.

2. A water soluble steroid complex consisting of the combination of testosterone and sodium salicylate in the ratio of one mol of testosterone to four mols of sodium salicylate.

3. A water soluble steroid complex consisting of the combination of methyl testosterone and sodium salicylate in the ratio of one mol of methyl testosterone to four mols of sodium salicylate.

4. A water soluble steroid complex consisting of the combination of progesterone and sodium silicylate in the ratio of one mol of progesterone to six mols of sodium salicylate.

5. A water soluble steriod complex consisting of the combination of cortisone and sodium salicylate in the ratio of one mol of cortisone to eight mols of sodium salicylate.

6. A water soluble steriod complex consisting of the combination of 17α-hydroxycorticosterone and sodium salicylate in the ratio of one mol of 17α-hydroxycorticosterone to six mols of sodium salicylate.

7. A water soluble progesterone complex having the following formula:

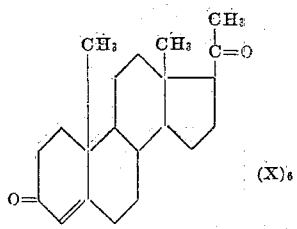

wherein X is selected from the group consisting of alkali metal and ammonium salicylates.

8. A process for the production of a water soluble complex comprising reacting a 3-keto-$\Delta^4$-cyclopentanoperhydrodimethylphenanthrene compound and a salicylate selected from the group consisting of alkali metal salicylates and ammonium salicylate in an aqueous medium wherein the salicylate is present in a concentration greater than approximately 2 mols per liter.

9. A process for the production of a water soluble complex comprising heating a 3-keto-$\Delta^4$-cyclopentanoperhydrodimethylphenanthrene compound and a salicylate selected from the group consisting of alkali metal salicylates and ammonium salicylate in an aqueous medium wherein the salicylate is present in a concentration greater than approximately 2 mols per liter.

References Cited in the file of this patent

UNITED STATES PATENTS

| Number | Name | Date |
|---|---|---|
| 2,182,920 | Hartmann | Dec. 12, 1939 |
| 2,196,495 | Greenbaum | Apr. 9, 1940 |
| 2,581,850 | Fleischhaker | Jan. 8, 1952 |

OTHER REFERENCES

Bresser: Pharm. Zentralhalle 71, 449–450 (1930).